(12) United States Patent
Ohkawa et al.

(10) Patent No.: US 7,675,276 B2
(45) Date of Patent: Mar. 9, 2010

(54) DC/DC CONVERTER

(75) Inventors: Satoru Ohkawa, Tokyo (JP); Norimasa Hane, Tokyo (JP); Takeshi Naka, Tokyo (JP)

(73) Assignees: Torex Semiconductor Ltd., Tokyo (JP); Device Engineering Co., Ltd., Tokyo (JP)

( * ) Notice: Subject to any disclaimer, the term of this patent is extended or adjusted under 35 U.S.C. 154(b) by 281 days.

(21) Appl. No.: 11/915,105

(22) PCT Filed: May 8, 2006

(86) PCT No.: PCT/JP2006/309928

§ 371 (c)(1),
(2), (4) Date: Nov. 20, 2007

(87) PCT Pub. No.: WO2006/123738

PCT Pub. Date: Nov. 23, 2006

(65) Prior Publication Data

US 2009/0079410 A1    Mar. 26, 2009

(30) Foreign Application Priority Data

May 20, 2005    (JP)    ............................. 2005-147816

(51) Int. Cl.
*G05F 1/40* (2006.01)
*G05F 1/56* (2006.01)

(52) U.S. Cl. ........................ 323/271; 323/282; 323/285

(58) Field of Classification Search ................. 323/222, 323/225, 268, 271, 282–285, 349–351
See application file for complete search history.

(56) References Cited

U.S. PATENT DOCUMENTS

| | | | | |
|---|---|---|---|---|
| 6,127,814 A | * | 10/2000 | Goder | ......................... 323/282 |
| 6,441,597 B1 | * | 8/2002 | Lethellier | .................... 323/282 |
| 6,933,706 B2 | | 8/2005 | Shih | |
| 6,958,592 B2 | * | 10/2005 | Chapuis | ...................... 323/246 |
| 6,998,824 B2 | | 2/2006 | Nishimaki | |
| 7,095,218 B2 | * | 8/2006 | Kobayashi | ................... 323/282 |
| 2008/0290854 A1 | * | 11/2008 | Uchiike | ...................... 323/284 |

FOREIGN PATENT DOCUMENTS

| | | |
|---|---|---|
| JP | 2555245 A | 11/1997 |
| JP | 11089222 A | 3/1999 |
| JP | 2002281743 A | 9/2002 |
| JP | 2002369516 A | 12/2002 |
| JP | 2004056983 A | 2/2004 |
| JP | 2005094994 A | 4/2005 |

* cited by examiner

*Primary Examiner*—Matthew V Nguyen
(74) *Attorney, Agent, or Firm*—The Webb Law Firm

(57) ABSTRACT

A DC/DC converter includes a main switching element and a subordinate switching element, and is arranged to supply power to load via a coil. The ON-time of a subordinate switching element in a succeeding cycle is controlled based on a period of time tdif from the time when the subordinate switching element is turned off until the time when voltage at the point of connection of the two switching elements reaches a predetermined threshold value.

6 Claims, 7 Drawing Sheets

DC/DC CONVERTER

TECHNICAL FIELD

This invention relates to a DC/DC converter and, more particularly, that useful when applied in obtaining a predetermined direct current output voltage by alternately turning on or off a main switching means and a subordinate switching means.

BACKGROUND ART

A DC/DC converter is frequently used in applications for lowering or raising the output voltage of a DC power source to obtain a predetermined direct current output voltage, for example, a power circuit for a mobile phone. The DC/DC converter turns a switching element on/off, and controls the on/off period in this case, thereby converting a direct current input voltage into a predetermined direct current output voltage. MOSFET is generally used as the switching element.

This type of DC/DC converter has a coil. Thus, there is need to form a closed circuit for releasing electrical energy accumulated in the coil during the off-period of the switching element. Previously, the closed circuit was formed by a free-wheeling diode.

When the free-wheeling diode was used, however, its forward voltage drop was relatively great, thus posing the problem that power consumption at this portion aroused a decrease in the efficiency of the DC/DC converter.

Under these circumstances, a proposal has been made for a DC/DC converter which uses MOSFET being a switching element instead of the free-wheeling diode, and utilizes the switching function of the MOSFET itself to curtail the above-mentioned forward voltage drop. Incidentally, compared with the forward voltage of the free-wheeling diode, voltage loss due to the resistance of MOSFET in the ON-state is small, and power loss is diminished correspondingly.

Incidentally, in the DC/DC converter in which the free-wheeling diode has been replaced by the switching element, two of the switching elements composed of MOSFET's are connected to each other in series. That is, the switching element for converting the output voltage to a desired value (hereinafter referred to as a main switching element), and the switching element for releasing energy accumulated in the coil during the OFF-period of the main switching element (hereinafter referred to as a subordinate switching element) are connected to each other in series A step-down DC/DC converter, for example, is constituted such that a direct current output voltage is withdrawn from the point of connection between both switching elements via the coil.

In this type of DC/DC converter, however, the following harmful phenomenon may arise: When, in a mode where the main switching element is in the OFF-state, and the subordinate switching element is in the ON-state, the subordinate switching element is switched to the OFF-state, an electric current based on the energy accumulated in the coil flows into the DC power source via a parasitic diode of the main switching element.

In order to avoid such a harmful phenomenon, in this type of DC/DC converter according to the prior art, it is common practice to monitor the coil current flowing through the subordinate switching element, detect a point in time at which the coil current becomes zero, and switch the subordinate switching element to the OFF-state at the time of the detection. This is because the harmful phenomenon occurs after the coil current becomes zero.

Thus, in the DC/DC converter according to the prior art, which has the main switching element and the subordinate switching element and turns these switching elements on/off alternately to obtain a predetermined direct current output voltage, a current detection circuit is provided in order to detect the above coil current (particularly, its direction). Such a current detection circuit can be realized, for example, by utilizing the ON-state resistance of the subordinate switching element, or by connecting in series a resistor for current detection, and comparing voltages at both ends of this resistor by a comparator for the purpose of monitoring. That is, when the voltage between both ends of the resistor has become zero, it can be detected that the coil current, which is the object to be detected, has become zero.

The following patent documents exist as publicly known documents disclosing DC/DC converters each of which has a main switching element and a subordinate switching element and turns these switching elements on/off alternately to obtain a predetermined direct current output voltage.

Patent Document 1: Japanese Utility Model Registration No. 2555245

Patent Document 2: Japanese Patent No. 3637904

The above-mentioned current detection circuit uses, as a current detection means, the current detection resistor of a very low value, or the ON-state resistance of the subordinate switching element. Thus, the level of the detected voltage is so low that the point in time at which the current has become zero needs to be detected promptly at a high speed and with high accuracy. Therefore, if the comparator is included as stated above, for example, it is necessary to use a comparator having a high speed and high accuracy. Not only is this comparator itself costly, but a high speed, high accuracy current detection circuit has to be constructed. A high drive current is required for the current detection circuit, and presents an impediment to downsizing or efficiency improvement of the DC/DC converter. If the resistor is included in series with the switching element as the current detection circuit, a power loss is caused by the resistor itself, becoming an obstacle to realization of high efficiency. Moreover, the level of the detection voltage is so low as to make a quick response difficult. Thus, actions may be rendered unstable by deviation due to offsetting of the comparator or a response delay. These are fatal drawbacks, particularly when the DC/DC converter is formed into an IC chi configuration.

The present invention has been accomplished in the light of the above-described conventional technologies. It is an object of the invention to provide a DC/DC converter which alternately turns on/off a main switching means and a subordinate switching means to obtain a desired direct current output voltage, which can eliminate a harmful phenomenon ascribed to the inversion of the polarity of a current flowing into a coil, and can also contribute to efficiency improvement, downsizing including IC chip formation, and cost reduction.

SUMMARY OF THE INVENTION

The features of the present invention, which attain the above object, are characterized by the following:

1) A DC/DC converter comprising two switching means connected in series, and a coil connected to a point of connection between the two switching means, and being arranged to convert a direct current input voltage to a predetermined direct current output voltage and supply power to load via the coil, the DC/DC converter further comprising control means configured such that when the switching means turned on during accumulation of energy in the coil is the main switching means, and the switching means turned on during delivery of the energy accumulated in the coil to an output side is the subordinate switching means, the ON-time of the subordinate switching means in the succeeding cycle is controlled based on the period of time from the time when the subordinate switching means is turned off until a time when a voltage at the point of connection of the two switching means reaches a predetermined threshold value.

2) In 1) above, the control means is configured to control the ON-time of the subordinate switching means in the succeeding cycle such that the polarity of a current flowing through the coil is not inverted.

3) In 1) or 2) above, the ON-time of the subordinate switching means in the succeeding cycle is controlled based on a potential accumulated in a capacitor during the period of time from the time when the subordinate switching means is turned off until the time when the voltage at the point of connection of the two switching means reaches the predetermined threshold value.

4) In 3) above, the potential accumulated in the capacitor is controlled by a predetermined value in each cycle before the subordinate switching means is turned off.

5) The DC/DC converter according to 1) to 4) above is either a step-down converter or a step-up converter.

6) The DC/DC converter according to 1) to 4) above is such that the control section adopts a PWM method and/or a PFM method in order to obtain a switching pulse for the main switching means.

EFFECTS OF THE INVENTION

According to the present invention, based on the period of time from the time when the subordinate switching means is turned off until the time when the voltage at the point of connection of the two switching means reaches the predetermined threshold value set to be easily detectable, the OFF-time of the subordinate switching means in the succeeding cycle is controlled such that the polarity of the coil current is not inverted. Thus, a quick response is not necessary, and current consumption can be reduced.

BEST MODE FOR CARRYING OUT THE INVENTION

Embodiments of the present invention will now be described in detail based on the accompanying drawings.

Figure 1:
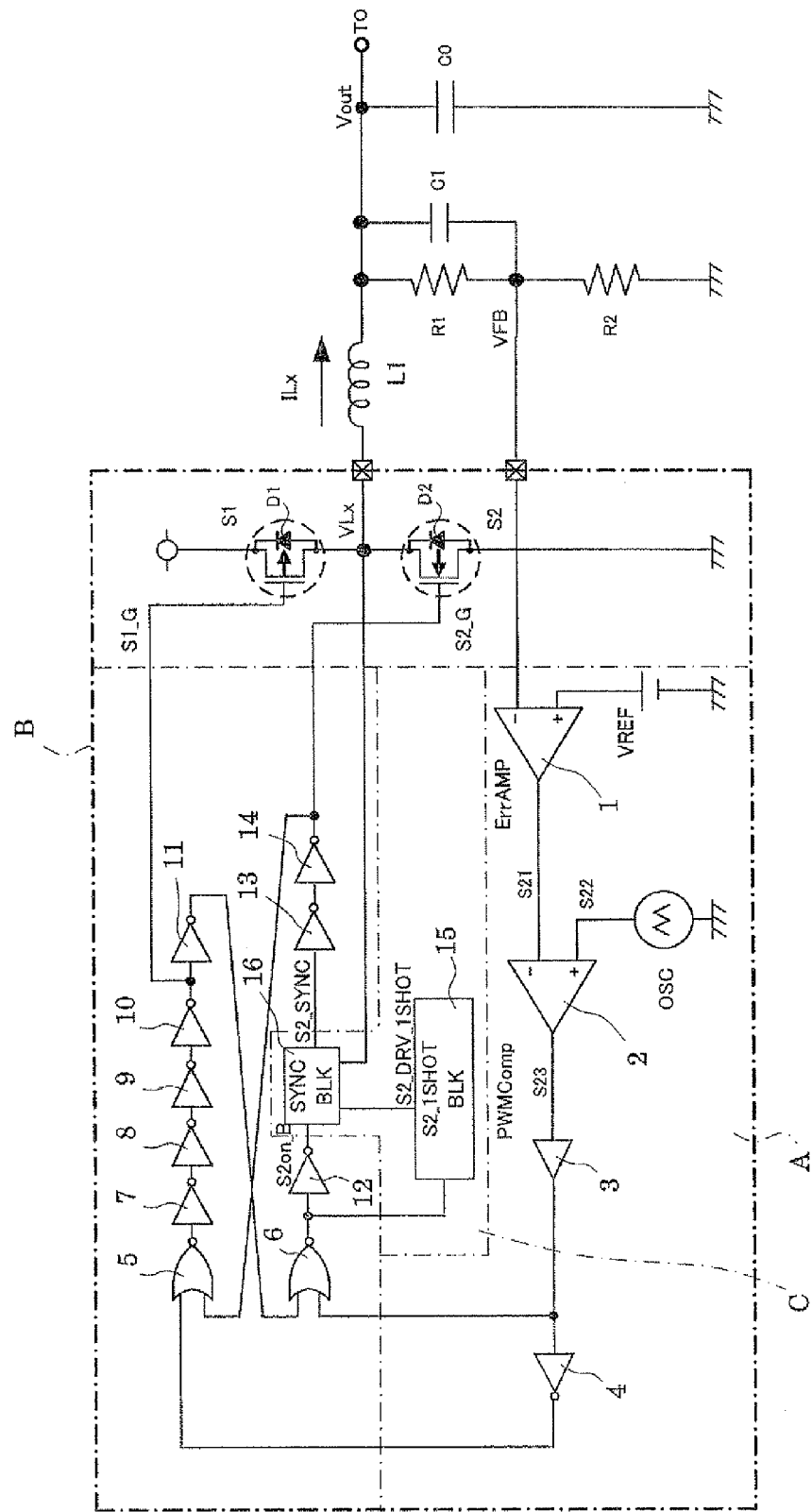
FIG. 1 is a circuit diagram showing a DC/DC converter, which is a step-down converter, according to an embodiment of the present invention, together with its control circuit.

FIG. 1 is a circuit diagram showing a step-down DC/DC converter according to an embodiment of the present invention, together with its control circuit.

In the DC/DC converter according to the present embodiment, a main switching element S1 formed from MOSFET having a parasitic diode D1 connected thereto in parallel is connected to a coil L1 in series. A subordinate switching element S2 formed from MOSFET having a parasitic diode D2 connected thereto in parallel is connected to the point of connection between the main switching element S1 and the coil L1. A direct current output voltage Vout can be withdrawn via the coil L1 and an output terminal TO. The main switching element S1 is a switching means which becomes ON when energy is to be accumulated in the coil L1. The subordinate switching element S2 is a switching means which becomes ON when the energy accumulated in the coil L1 is to be delivered to the output side. The parasitic diode D2 also functions as a free-wheeling diode.

In this DC/DC converter, a control section exercises control for alternately turning the main switching element S1 and the subordinate switching element S2 on or off. Also, the ON-time of the main switching element S1 in this case is controlled, whereby the direct current output voltage of a DC power source (not shown) (i.e., the direct current output voltage is the direct current input voltage of the DC/DC converter) is stepped down to obtain the direct current output voltage Vout of a predetermined value from the output terminal TO. That is, the direct current output voltage Vout is regulated by the ON-time (duty) of the main switching element S1. The electrical energy accumulated in the coil L1 during the ON-period of the main switching element S1 is released by wheeling via the subordinate switching element S2 and its parasitic diode D2 during the OFF-period of the main switching element S1. In the drawing, C0 is a capacitor for smoothing the direct current output voltage Vout.

The control section for exercising on/off control of the main switching element S1 and the subordinate switching element S2 has a PWM signal generation portion A, a buffer portion B, and a switching signal control portion C, and is constructed together with the main switching element S1 and the subordinate switching element S2.

In the PWM signal generation portion A, the direct current output voltage Vout is divided by resistors R1, R2 and a capacitor C1, and applied to an error amplifier 1. To this error amplifier 1, a reference voltage VREF is also applied. As a result, an error signal S21 is obtained. In a comparator 2, the error signal S21 and a triangular wave S22 fed by an oscillator OSC are compared to obtain a PWM signal S23 as an output signal.

The PWM signal S23 is sent to the buffer portion B via a buffer amplifier 3 or via the buffer amplifier 3 and an inverter 4. The buffer portion B is composed of two NOR circuits 5 and 6, and eight inverter circuits 7 to 14, and turns the main switching element S1 and the subordinate switching element S2 on or off alternately based on the PWM signal S23.

In the present embodiment, the main switching element S1 is a P-channel element, and thus goes into the ON-state when the output signal S1_G of the buffer portion B is in the L-state.

On the other hand, the subordinate switching element S2 is an N-channel element, and thus goes into the ON-state when the output signal S2_G of the buffer portion B is in the H-state. It goes without saying that the buffer portion B is not limited to the configuration shown in FIG. 1.

The switching signal control portion C detects a voltage signal $VL_x$ at the point of connection between the main switching element S1 and the subordinate switching element S2. Based on the period from the time when the subordinate switching element S2 becomes OFF until the time when the voltage signal VLx reaches a predetermined threshold value, the switching signal control portion C controls the OFF-time of the subordinate switching element S2 in a succeeding cycle so that the polarity of a coil current ILx flowing through the coil L1 is not inverted. Incidentally, the coil current ILx is taken to flow in a normal direction when flowing in a direction indicated by an arrow in the drawing.

Here, the switching signal control portion C according to the present embodiment has a 1-shot block 15 and a sync block 16. The 1-shot block 15 goes into the H-state at the rising of the switching pulse S2_G for turning on the subordinate switching element S2, thereby generating a 1-shot pulse S2_DRV_1SHOT lasting for a predetermined period of time. The sync block 16 receives the voltage signal VLx, and generates a pulse signal S2_SYNC which regulates a timing for turning on or off the subordinate switching element S2, particularly, a timing for turning it off.

Figure 2:
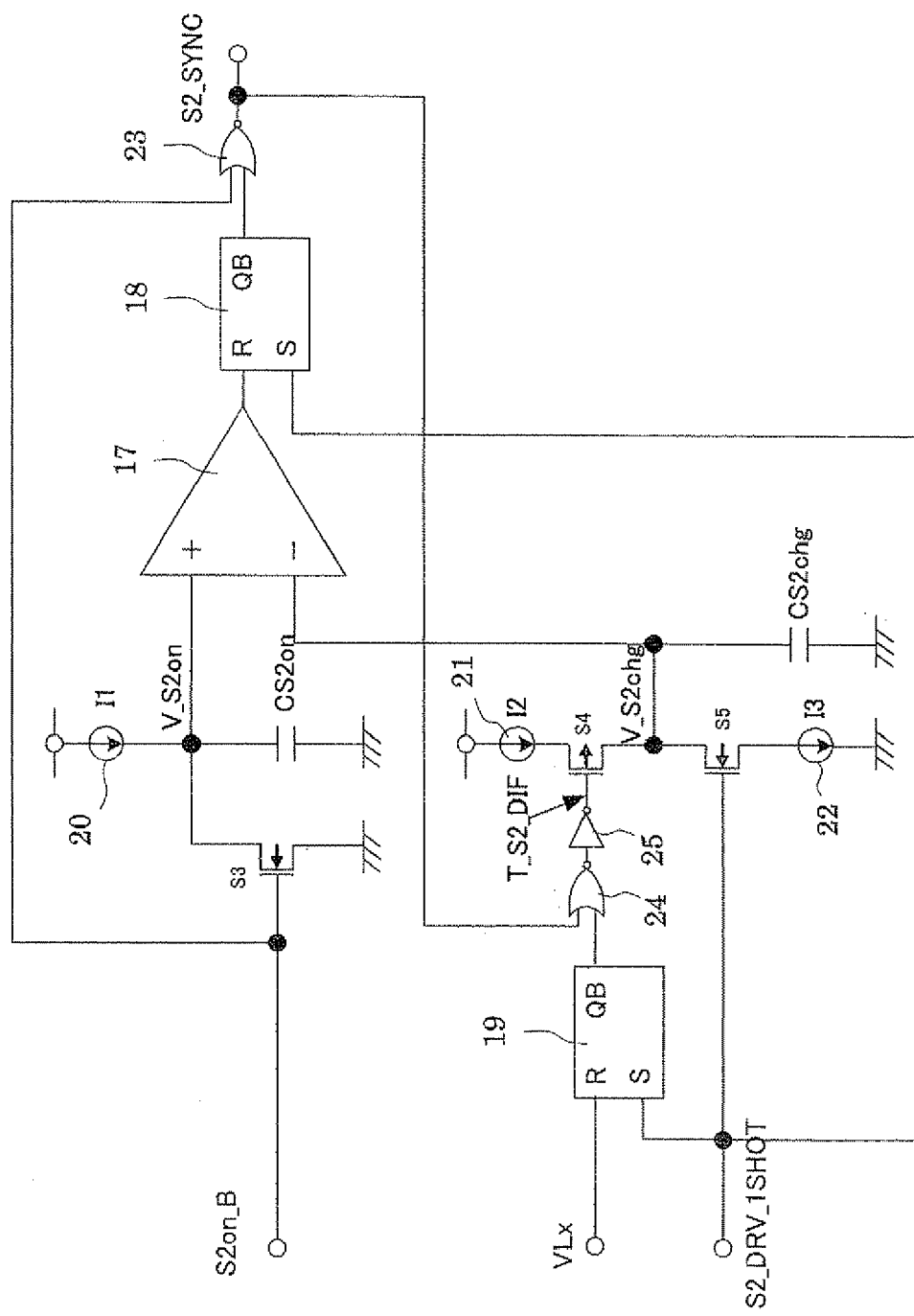
FIG. 2 is a circuit diagram showing an example of the concrete configuration of a sync block in a control section shown in FIG. 1.

FIG. 2 is a circuit diagram showing an example of the concrete configuration of the sync block 6. In the drawing, the numeral 17 denotes a comparator, 18, 19 each denote an RS flip-flop circuit, 20, 21, 22 each denote a constant-current source, 23, 24 each denote a NAND circuit, 25 denotes an inverter, and S3, S4, S5 each denote a switching element.

As shown in the drawing, the RS flip-flop circuit 18 is set at the rising of the 1-shot pulse S2_DRV_1SHOT, which goes into the H-state at the rising of the switching pulse S2_G turning on the subordinate switching element S2, and is reset by the output signal of the comparator 17. In the present embodiment, the QB output (inverted output) of the RS flip-flop circuit 18 is utilized. Thus, when the output signal of the comparator 17 at the time of resetting rises into the H-state, the pulse signal S2_SYNC falls into the L-state. As a result, the subordinate switching element S2 is brought into the OFF-state.

The RS flip-flop circuit 19 is also set at the rising of the 1-shot pulse S2_DRV_1SHOT. On the other hand, resetting of the RS flip-flop circuit 19 is performed when the voltage signal $VL_x$ reaches a predetermined threshold value. No limitations are imposed on the threshold value, as long as it is a parameter which priorly reflects the inversion of the polarity of the coil current ILx. Its preferred examples are the logic level of the RS flip-flop circuit 19 (i.e., intermediate potential between the operating voltage and GND), the threshold value of MOSFET (of the order of 0.7V), and the GND level (0V). These are easily detectable values.

A capacitor CS2on is gradually charged with a constant current I1, which is supplied by the constant-current source 20, during the OFF-state of the switching element S3, and applies a voltage V_S2 on to a non-inverting input terminal of the comparator 17. Here, the switching element S3 remains in the ON-state when a switching pulse S2on_B is in the H-state, in other words, during a period which is the sum of the period when the main switching element S1 is in the ON-state, and a blank period, thereby interrupting the charging of the capacitor CS2on by the constant-current source 20.

A capacitor CS2chg is gradually charged with a constant current I2, which is supplied by the constant-current source 21, during the ON-state of the switching element S4 and the OFF-state of the switching element S5, and applies a voltage V_S2chg to an inverting input terminal of the comparator 17. That is, the switching element S4 remains in the ON-state when the pulse signal S2_SYNC is in the L-state, in other words, during a period from the time when the subordinate switching element S2 goes into the OFF-state until the time when the voltage signal VLx reaches the threshold value, thereby allowing the capacitor CS2chg to be charged by the constant-current source 21. In the present embodiment, the period from the time when the subordinate switching element S2 goes into the OFF-state until the time when the voltage signal VLx reaches the threshold value is reflected in a succeeding cycle to attain the intended object.

On the other hand, the switching element S5 is in the ON-state during the period in which the 1-shot pulse S2_DRV_1SHOT is in the H-state to pull out the electric charge charged into the capacitor CS2chg with a constant current I3 of the constant-current source 22. As a result, the voltage V_S2chg is slightly lowered. This means that the comparative reference voltage applied to the inverting input terminal of the comparator 17 has lowered correspondingly.

Next, overall actions will be described using a waveform view showing a timing chart based on the signals from the respective portions of the control section shown in FIG. 1.

Figure 3:
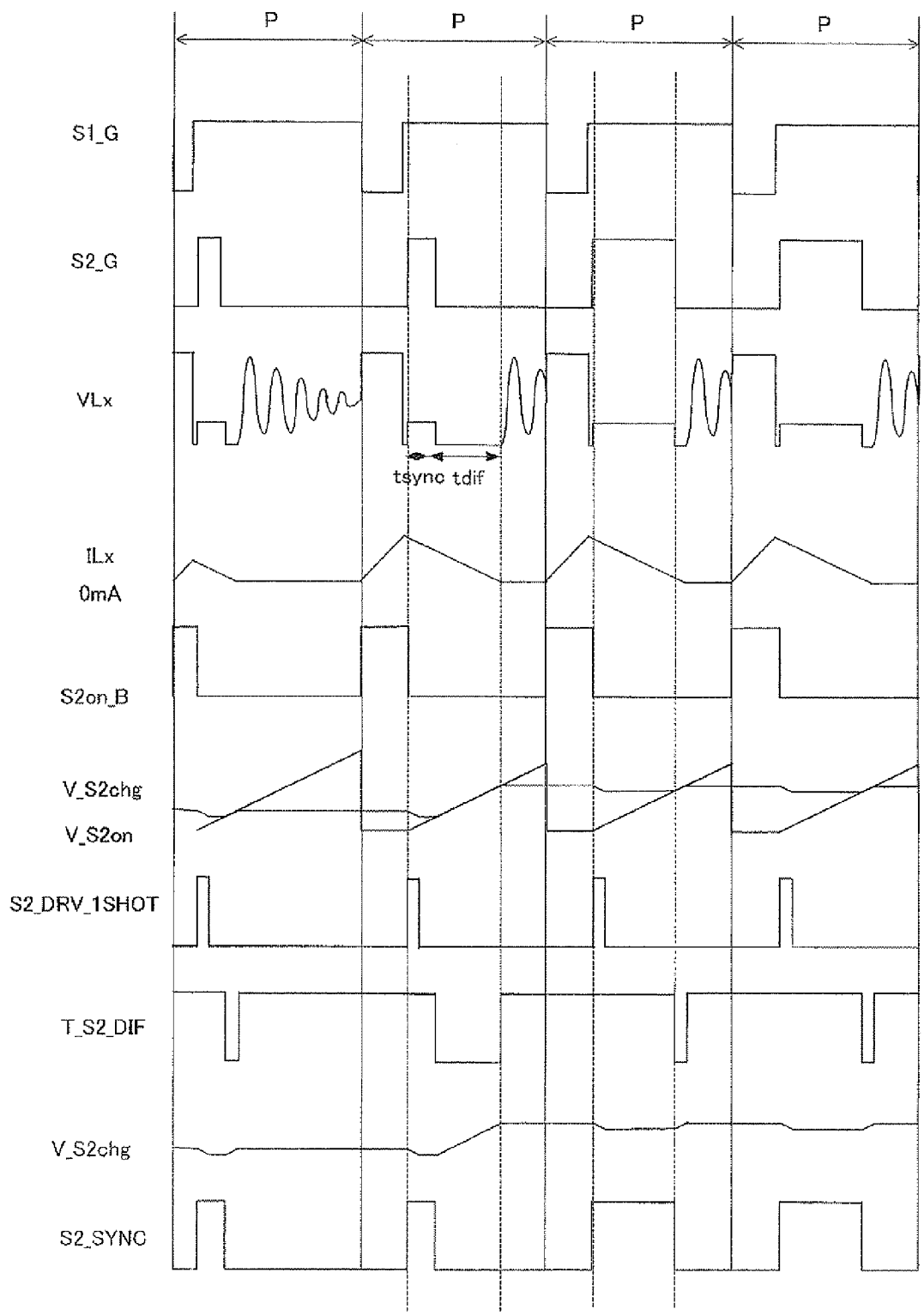
FIG. 3 is a waveform view showing a timing chart based on signals from respective portions of the control section shown in FIG. 1 (a case where the ON-period of a subordinate switching element S2 is extended in a discontinuous mode)

FIG. 3 is a waveform drawing showing the waveforms of the respective portions when the ON-time of the subordinate switching element S2 (i.e., tsync) is short, and its OFF-time is long, during a current-discontinuous period. The current-discontinuous period refers to a period in which at an instant when the main switching element S1 is turned on in one cycle P formed by the PWM signal 93 (see FIG. 1), the coil current ILx starts at 0 mA, and returns to 0 mA after it is turned off. In other words, this is a case where there is a period in which the coil current ILx becomes 0 mA within one cycle P.

As shown in FIG. 3, the switching pulse S1_G turns on the main switching element S1, which is the P-type MOSFET, when the switching pulse S1_G changes into the L-state. When the switching pulse S1_G changes into the H-state, it turns off the main switching element S1. The switching pulse S2_G turns on the subordinate switching element S2, which is the N-type MOSFET, when the switching pulse S2_G changes into the H-state. When the switching pulse S2_G changes into the L-state, it turns off the subordinate switching element S2. In this manner, the main switching element S1 and the subordinate switching element S2 are turned on alternately.

As a result, the coil current ILx gradually increases from the moment of the main switching element S1 being turned on, peaks at the moment of the main switching element S1 being turned off, and gradually decreases thereafter.

On the other hand, the voltage signal VLx is controlled such that a period of time, tdif, from the time when the subordinate switching element S2 is turned off until the time when the voltage signal VLx reaches a predetermined threshold value is reflected in the ON-time of the subordinate switching element S2 (tsync) in a next cycle P. That is, tsync is lengthened and tdif is shortened so that the sum of the ON-time of the subordinate switching element S2 (tsync) and the period of time tdif from the turning-off of the subordinate switching element S2 until the voltage signal VLx reaches the predetermined threshold value, in the preceding cycle P, will be equal in the succeeding cycle P. A detailed description of this procedure will be offered below.

1) The switching pulse S2on_B, as stated earlier, is in the ON-state during the period which is the sum of the period when the main switching element S1 is in the ON-state, and the blank period, thereby interrupting charging into the capacitor CS2on by the constant-current source 20. Thus, during the ON-period of the subordinate switching element S2, the switching pulse S2on_B is in the L-state, so that the switching element S3 remains in the OFF-state, whereby the capacitor CS2on is charged.

2) As a result, the voltage V_S2 on gradually increases linearly until the switching pulse S2on_B rises to the H-state.

3) The 1-shot pulse S2_DRV_1SHOT rises in synchronism with the rising of the switching pulse S2_G.

4) A pulse signal T_S2_DIF is a signal based on the QB output (inverted output) of the RS flip-flop circuit 19 set by the 1-shot pulse S2_DRV_1SHOT and the pulse signal S2_SYNC.

Thus, the pulse signal T_S2_DIF remain in the L-state during the period from the time when the subordinate switching element S2 is turned off until the time when the voltage signal VLx reaches the predetermined threshold value, namely, during the period of time tdif. As a result, the switching element S4 goes into the ON-state.

5) The voltage V_S2chg gradually increases linearly during the ON-state of the switching element S4, i.e., during the period of time tdif, since the capacitor CS2chg is charged. The amount of increase in the voltage V_S2chg reflects the period of time tdif.

During the rising of the 1-shot pulse S2_DRV_1SHOT and its H-state, the switching element S5 remains in the ON-state. During this period, therefore, the charge accumulated in the capacitor CS2chg is withdrawn by the constant current I3 of the constant-current source 22. As a result, the voltage V_S2chg gradually decreases during the H-period of the 1-shot pulse S2_DRV_1SHOT.

(6) The voltage V_S2 on is inputted into the non-inverting input terminal of the comparator 17, while the voltage V_S2chg is inputted into the inverting input terminal of the comparator 17. Thus, at the moment when the voltage V_S2 on gradually increases and intersects the voltage V_S2chg, the pulse signal S2_SYNC is caused to fall. That is, the timing with which the subordinate switching element S2 changes from the ON-state to the OFF-state is defined. In this manner, the pulse signal S2_SYNC is formed, and the switching pulse S2_G of the same waveform as that of the pulse signal S2_SYNC is formed.

As shown in FIG. 3, the present embodiment is constituted such that the voltage V_S2 on and the voltage V_S2chg increase at the same rates in order to reflect the period of time tdif in the ON-time of the subordinate switching element S2 (i.e., tsync) in the next cycle P. That is, the present embodiment is constituted to fulfill the following conditions:

$$\text{ON-time of } S2 = \Delta T\text{sync} = CS2\text{on} \times \Delta V\_S2\text{chg}/I1 \quad (1)$$

$$\Delta V\_S2\text{chg} = I2 \times t\text{dif}/CS2\text{chg} \quad (2)$$

From Equations (1) and (2), $$\Delta T\text{sync} = CS2\text{on}/I1 \times I2/CS2\text{chg} \times t\text{dif} \quad (3)$$

Let, here, I1=I2 and CS2on=CS2chg, for example. Then, ΔTsync=tdif. The same relation generally holds, if the relation CS2on:CS2chg=1:n is true when I1:I2=n:1.

Figure 4:
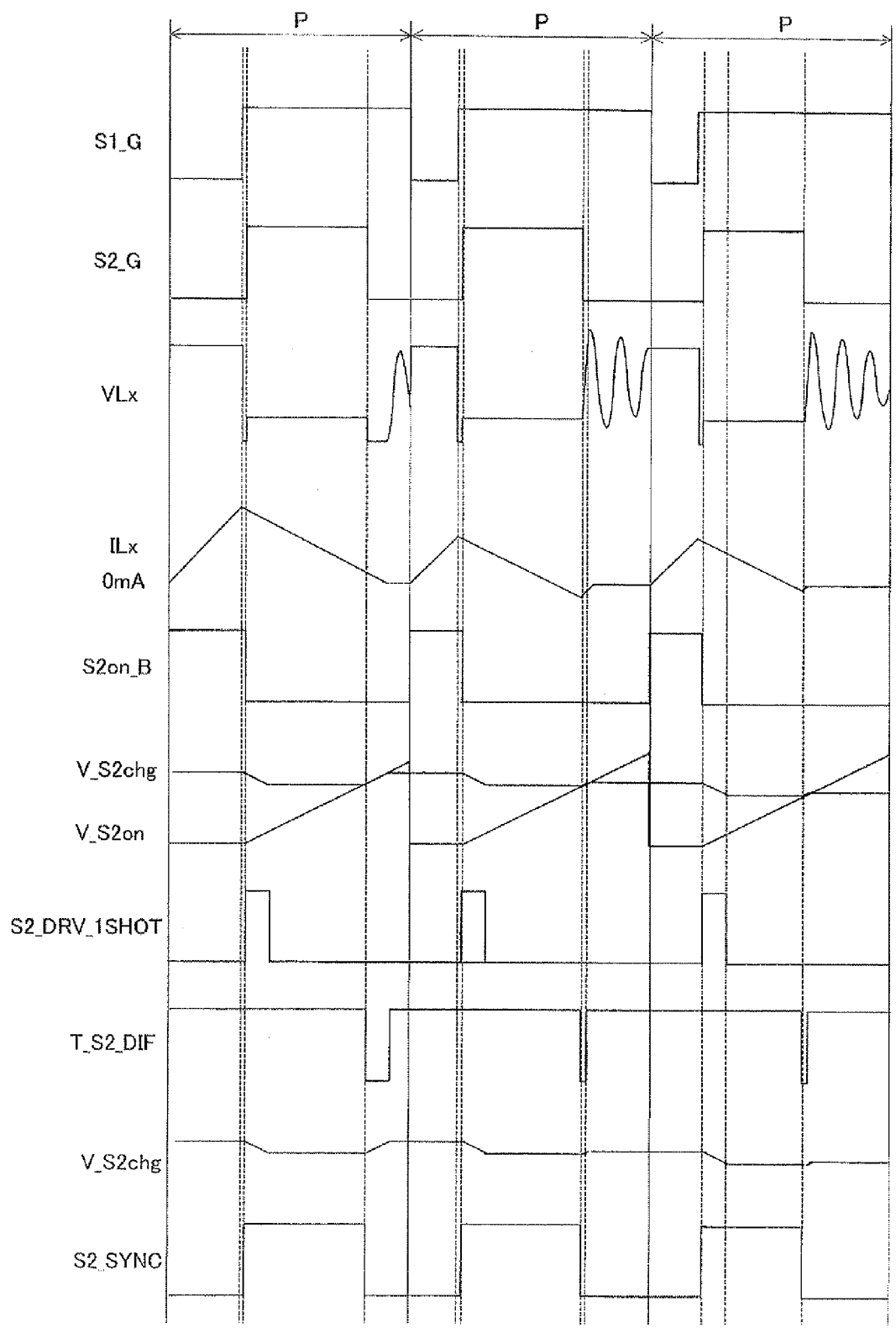
FIG. 4 is a waveform view showing a timing chart based on the signals from the respective portions of the control section shown in FIG. 1 (a case where load is lightened in the discontinuous mode.

The above represents a case where the ON-time of the subordinate switching element S2 (i.e., tsync) is extended. A case where the ON-time of the subordinate switching element S2 (i.e., tsync) is shortened will be described based on FIG. 4. FIG. 4, like FIG. 3, is a waveform view showing a timing chart based on the signals from the respective portions of the control section shown in FIG. 1. Here, differences from FIG. 3 will be mainly described, and duplicate explanations are omitted.

In this case, the load shifts to light load. Thus, the ON-period of the switching pulse S1_G shortens, and the peak of the coil current ILx lowers correspondingly. At this time, the switching pulse 32_G maintains the ON-time present one cycle earlier, so that the polarity of the coil current ILx may be inverted in the next cycle P. When the coil current ILx is inverted, the period of time from the time when the subordinate switching element S2 is turned off until the time when the voltage signal VLx reaches the predetermined threshold value is not existent any more. Thus, the pulse signal T_S2_DIF shortens.

Here, during the H-period of the 1-shot pulse S2_DRV_1SHOT, the switching element S5 is put in the ON-state to pull out the charge accumulated in the capacitor CS2chg, and during this period, the voltage V_S2chg is gradually decreased. This has an important meaning. That is, a decrease in the voltage V_S2chg means a decrease in the reference comparative voltage of the comparator 17. This hastens the moment at which the voltage V_Non gradually increasing in synchronism with the rising of the subordinate switching element S2 intersects the voltage V_S2chg. Hence, the moment of falling of the subordinate switching element S2 to the OFF-state, defined by the moment of intersection of the voltage V_Non and the voltage V_S2chg, moves forward in terms of time whenever one cycle P passes. Thus, the ON-time of the subordinate switching element S2 gradually shortens, and converges on an equilibrious state at the moment at which the charging and discharging of the voltage V_S2chg equilibrate.

The above-described actions will be mathematically expressed as follows:

$$\text{ON-time of } S2 = \Delta T\text{sync} = CS2\text{on} \times (\Delta V\_S2\text{chg}I3*S2\_DRV\_1\text{SHOT}/CS2\text{chg})/I1 \quad (4)$$

$$\Delta V\_S2\text{chg} = I2 \times t\text{dif}/CS2\text{chg} \quad (5)$$

From Equations (4) and (5), $$\Delta T\text{sync} = CS2\text{on} \times (I2 \times t\text{dif}/CS2\text{chg}I3*S2\_DRV\_1\text{SHOT}/CS2\text{chg})/I1 \quad (6)$$

Let, here, I1=I2=I3 and CS2on=CS2chg, for example. Then, ΔTsync=tdif S2_DRV_b 1SHOT.

Actually, ΔTsync is shortened for the H-period of the 1-shot pulse S2_DRV_1SHOT by means of I3.

In the above embodiment, an explanation has been offered for the control of the pulse signal T_SYNC by use of the 1-shot pulse S2_DRV_1SHOT, but this is not limitative. The same actions and effects can be expected even by a simple method, such as one which comprises always withdrawing the charge with a minute constant current.

Figure 5:
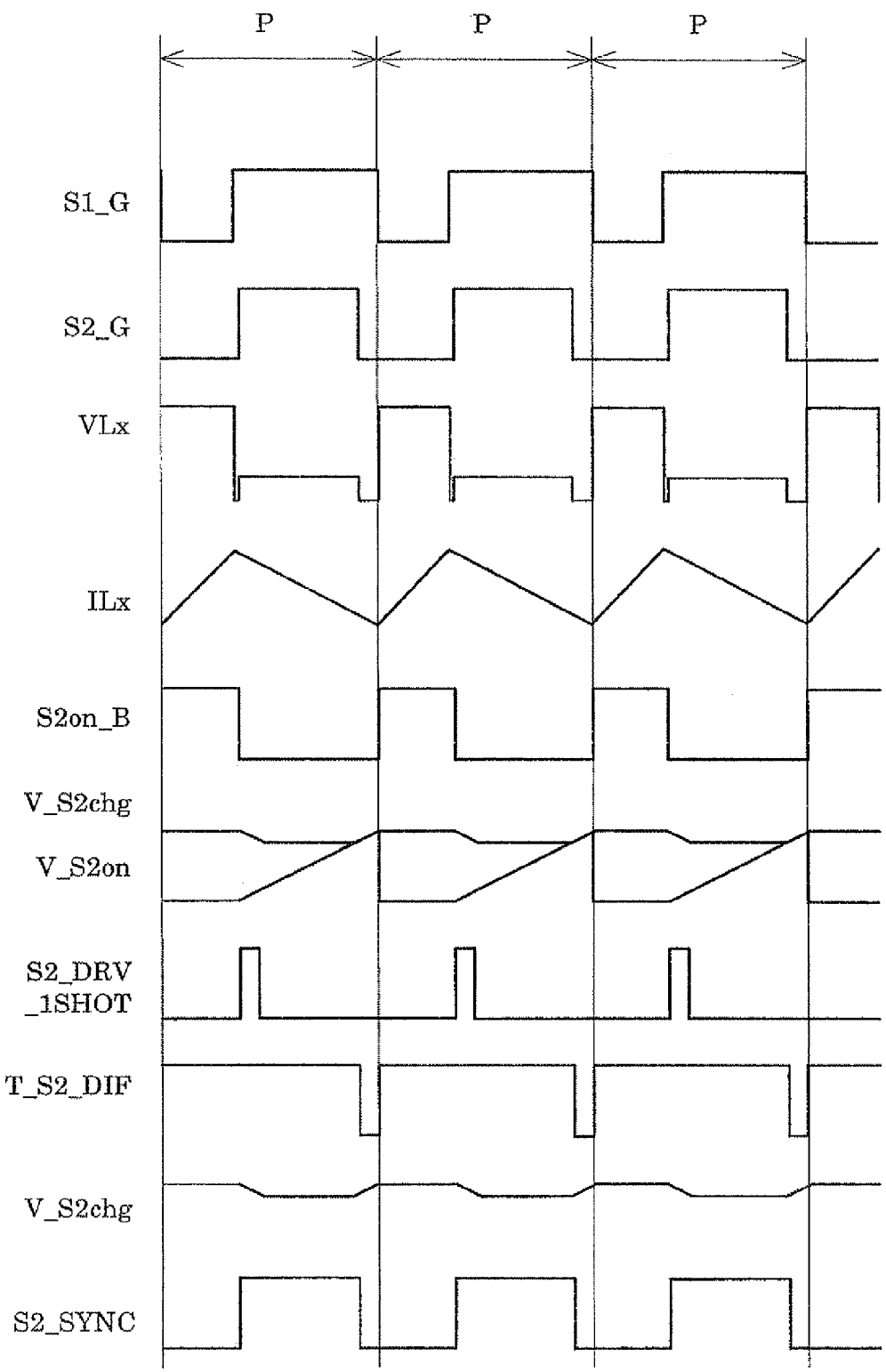
FIG. 5 is a waveform view showing a timing chart based on the signals from the respective portions of the control section shown in FIG. 1 (in the case of a continuous mode)

FIG. 5 is a waveform view showing the waveforms of the respective portions during a current-continuous period. The current-continuous period refers to a period in which at an instant when the main switching element S1 is turned on in one cycle P formed by the PWM signal S3 (see FIG. 1), the coil current ILx starts at 0 mA or higher, and does not return to 0 mA after it is turned off. In other words, this is a case where there is no period in which the coil current (load current) ILx becomes 0 mA within one cycle P.

During this current-continuous period, as shown in FIG. 5, the moment of intersection between the voltage V_S2on and the voltage V_S2chg is identical in each cycle P. Thus, the same period of time tdif as the period of time tdif of the preceding cycle P is ensured for the succeeding cycle P. Hence, the signal of the same waveform is repeated in each cycle P.

Figure 6:
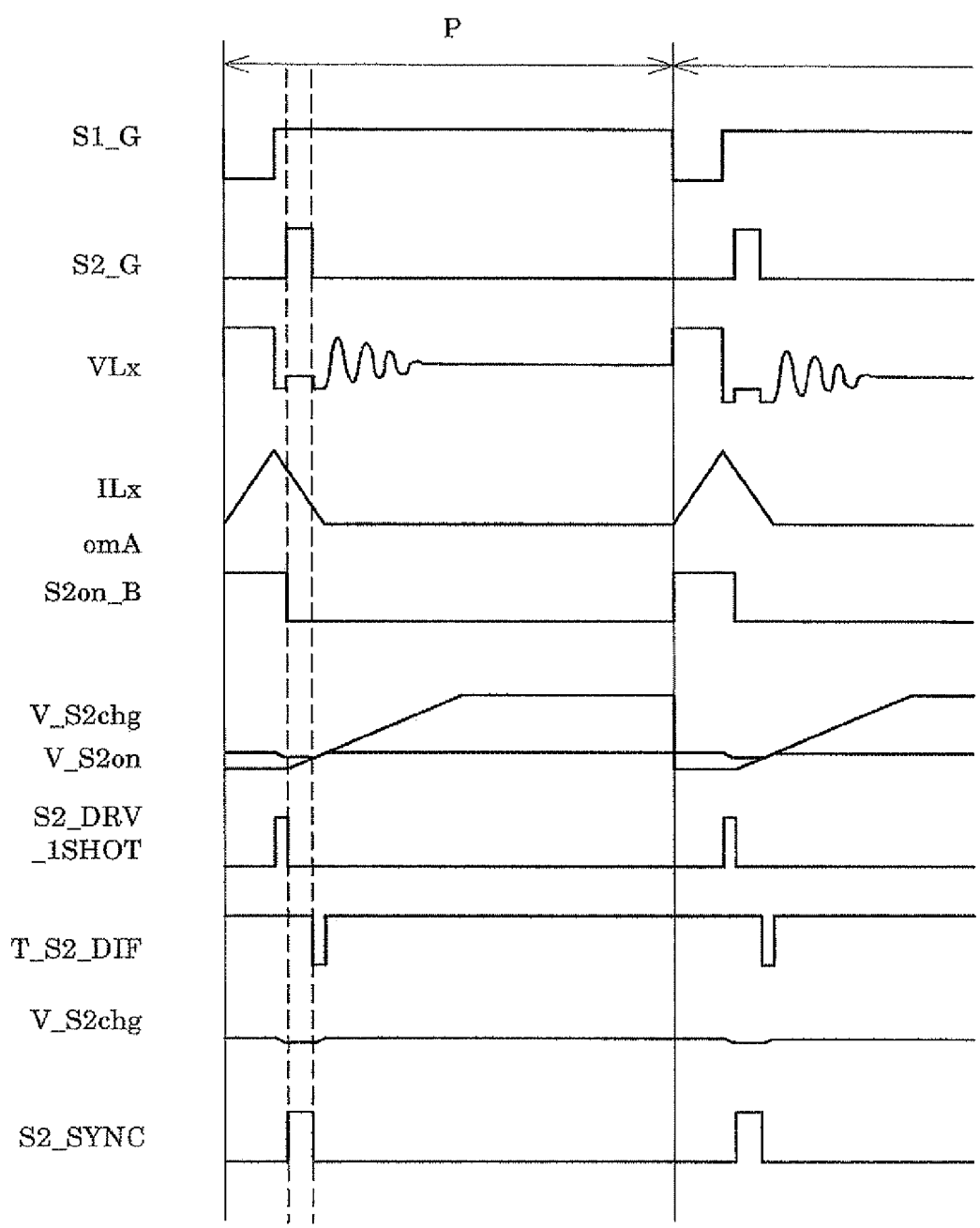
FIG. 6 is a waveform view showing a timing chart based on the signals from the respective portions when a main switching element s1 is controlled by a PFM method.

FIG. 6 is a waveform view showing a timing chart based on the signals from the respective portions when the main switching element S1 is controlled by the PFM method. With the PWM method, the duty of the switching pulse S1_G in each cycle P is controlled according to the lightness or heaviness of load. With the PFM method, on the other hand, frequency is controlled according to the lightness or heaviness of load. Specifically, a PFM signal generation portion is provided, instead of the PWM signal generation portion A, in the circuit shown in FIG. 1. In the PFM signal generation portion, the direct current output voltage Vout in FIG. 1 is divided by the resistors R1, R2 and the capacitor C1, and applied to the error amplifier 1. Furthermore, the applied voltage is compared with the reference voltage VREF in this error amplifier 1 to obtain the error signal S21, and based on the error signal S21, the frequency of a PFM signal is controlled.

With the PFM method, at the moment when the voltage V_S2 on intersects the voltage V_S2chg, the pulse signal S2_SYNC falls, whereby the switching pulse S2_G falls. As a result, the subordinate switching element S2 is turned off. That is, as with the circuit shown in FIG. 1, in accordance with the period of time tdif from the time when the subordinate switching element S2 is turned on until the time when the voltage signal VLx reaches the predetermined threshold value, the period of time tdif in the next cycle P is regulated.

Furthermore, it is possible to have both of the functions of the PWM method which controls the pulse width based on the error signal S21, and the PFM method which controls the pulse frequency based on the error signal S21. It is also possible to switch between both methods, as appropriate, thereby obtaining the output signal. In this case, both methods are switched such that the PFM method is utilized under light load, whereas the PWM method is utilized under heavy load.

The above-described embodiment involves the step-down DC/DC converter, but the present invention is not limited to the step-down DC/DC converter. The present invention can also be applied to other types, such as step-up, inverting, step-up/step-down, Cuk, Zeta, Sepic, forward, and flyback types.

Figure 7:
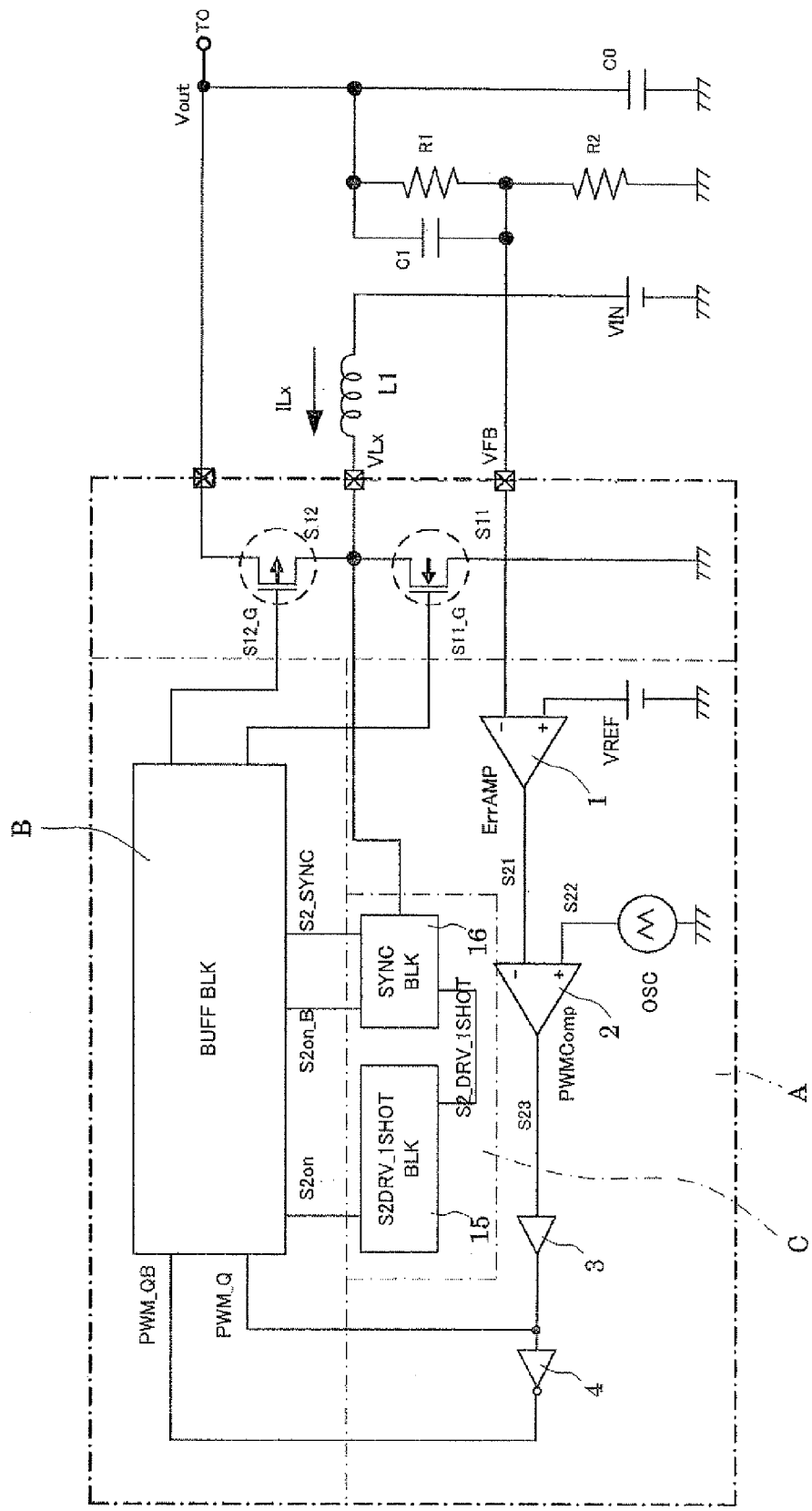
FIG. 7 is a circuit diagram showing a DC/DC converter, which is a step-up converter, according to an embodiment of the present invention, together with its control circuit.

FIG. 7 is a circuit diagram showing a DC/DC converter, which is a step-up converter, according to an embodiment of the present invention, together with its control circuit. Since this is a step-up converter, the direction of the coil current ILx flowing through the coil L1 is reversed, and the relationship between a main switching element S1 and a subordinate switching element S12 is reversed, as compared with the step-down converter shown in FIG. 1. That is, the main switching element S1 is composed of the same N-type MOSFET as that of the subordinate switching element S2 of FIG. 1, while the subordinate switching element S12 is composed of the same P-type MOSFET as that of the main switching element S1 of FIG. 1. A switching pulse S11_G is a switching pulse of the same waveform as that of the switching pulse S2_G of FIG. 1, while a switching pulse S12_G is a switching pulse of the same waveform as that of the switching pulse S1_G of FIG. 1. Other features are the same as those in FIG. 1. Thus, the same portions as those in FIG. 1 are assigned the same numerals and symbols as those in FIG. 1, and duplicate explanations are omitted.

The invention claimed is:

1. A DC/DC converter comprising two switching means connected in series, and a coil connected to a point of connection between the two switching means, and being arranged to convert a direct current input voltage to a predetermined direct current output voltage and supply power to load via the coil, the DC/DC converter further comprising control unit configured such that when the switching means turned on during accumulation of energy in the coil is main switching means, and the switching means turned on during delivery of the energy accumulated in the coil to an output side is subordinate switching means, an ON-time of the subordinate switching means in a succeeding cycle is controlled based on a period of time from a time when the subordinate switching means is turned off until a time when a voltage at the point of connection of the two switching means reaches a predetermined threshold value.

2. The DC/DC converter according to claim 1, characterized in that the control unit is configured to control the ON-time of the subordinate switching means in the succeeding cycle such that a polarity of a current flowing through the coil is not inverted.

3. The DC/DC converter according to claim 1, characterized in that the ON-time of the subordinate switching means in the succeeding cycle is controlled based on a potential accumulated in a capacitor during the period of time from the time when the subordinate switching means is turned off until the time when the voltage at the point of connection of the two switching means reaches the predetermined threshold value.

4. The DC/DC converter according to claim 3, characterized in that the potential accumulated in the capacitor is controlled by a predetermined value in each cycle before the subordinate switching means is turned off.

5. The DC/DC converter according to claim 1, characterized in that the DC/DC converter is one of a step-down converter or a step-up converter.

6. The DC/DC converter according to claim 1, characterized in that the control unit adopts one or both of a PWM method or a PFM method in order to obtain a switching pulse for the main switching means.

* * * * *

UNITED STATES PATENT AND TRADEMARK OFFICE
CERTIFICATE OF CORRECTION

PATENT NO. : 7,675,276 B2　　　　　　　　　　　　　　　　　　　　　　　Page 1 of 1
APPLICATION NO. : 11/915105
DATED : March 9, 2010
INVENTOR(S) : Ohkawa et al.

It is certified that error appears in the above-identified patent and that said Letters Patent is hereby corrected as shown below:

Face of the Patent, see Item (22) PCT Filed: "May 8, 2006" should read -- May 18, 2006 --

Signed and Sealed this

Twenty-seventh Day of July, 2010

David J. Kappos
*Director of the United States Patent and Trademark Office*